FIGURE 4
INFRA-RED ABSORPTION SPECTRUM OF COUMERMYCIN A₁ SODIUM SALT

COUMERMYCIN AND SALTS THEREOF

Hiroshi Kawaguchi, Masanori Okanishi, and Takeo Miyaki, Tokyo, Japan, assignors to Bristol-Banyu Research Institute, Ltd., Tokyo, Japan, a Japanese corporation
Filed Aug. 25, 1964, Ser. No. 392,003
14 Claims. (Cl. 260—210)

This invention relates to a new and useful substance called coumermycin and to processes for its production. More particularly, it relates to processes for its production by fermentation and methods for its recovery and purification. The invention embraces this acidic antibacterial agent and its alkaline salts in dilute solutions, as crude concentrates, as purified solids and in pure crystalline forms. Coumermycin is effective in inhibiting the growth of Gram-positive bacteria. Coumermycin is nontoxic and exhibits a therapeutic effect on mice infected with Gram-postive bacteria. Coumermycin has also been called antibiotic Bu–620 and "Notomycin." Coumermycin itself is a complex or mixture of five compounds which have been given the individual names of coumermycin $A_1$, coumermycin $A_2$, coumermycin B, coumermycin C and coumermycin D.

This application is a continuation-in-part of our prior copending applications Serial No. 247,435, filed December 17, 1962 and Serial No. 366,461, filed May 11, 1964 and both now abandoned.

The most important members of the coumermycin complex are coumermyin $A_1$ and coumermycin $A_2$ which have the formula wherein both R groups represent methyl in the case of coumermycin $A_1$ and represent hydrogen in coumermycin $A_2$. The coumermycin complex is referred to herein simply as coumermycin and is referred to in applicants' parent application Serial No. 247,435 simply as notomycin.

Figure 1:
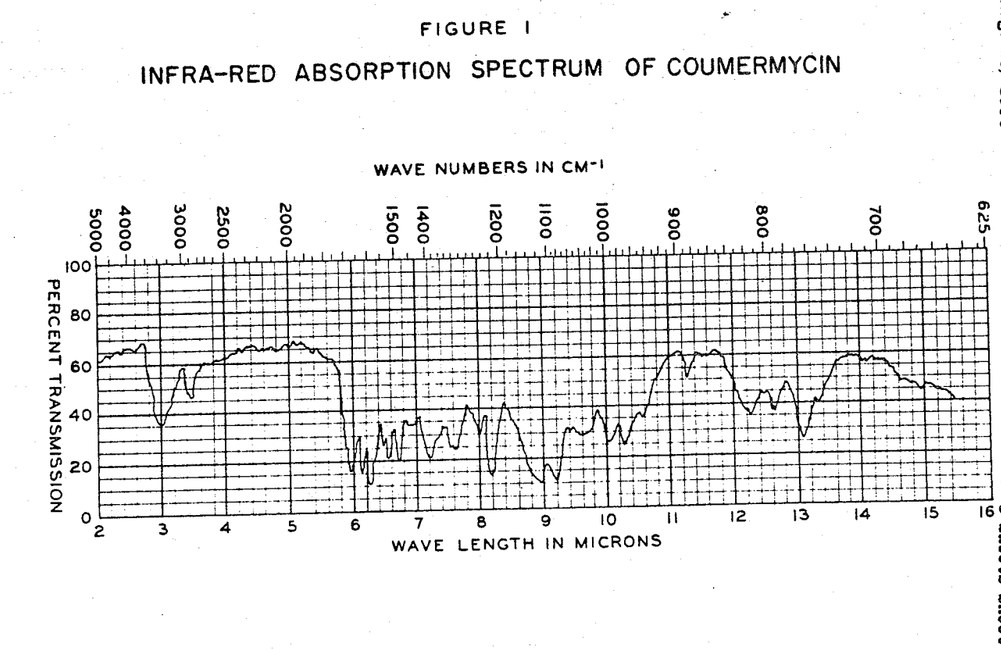
FIGURE 1 is a curve of the infrared absorption spectrum of coumermycin free acid when pelleted in potassium bromide.

There is now provided, according to the present invention, an antibiotic substance effective in inhibiting the growth of Gram-positive bacteria which is selected from the group consisting of an acidic substance, coumermycin, which is readily soluble in acetone, dioxane and alkaline water, moderately soluble in ethanol, butanol, ethyl acetate, butyl acetate and methyl isobutyl ketone, less soluble in benzene, methanol and chloroform and insoluble in carbon tetrachloride, petroleum ether and acidic water, which gives positive Fehling and Molisch reactions, decolorizes bromine and gives negative ninhydrin, Tollens and anthrone reactions and which in purified form melts at 222–224° C., exhibits $[\alpha]_D^{20}$ of $-134°$ (c.=1.0 acetone), exhibits an ultraviolet absorption spectra in ethanol having maxima at $$275 \text{ m}\mu \ (E^{1\%}_{1\text{cm.}}=595)$$

and at $$335 \text{ m}\mu \ (E^{1\%}_{1\text{cm.}}=498)$$

in N/10 HCl having maxima at $$275 \text{ m}\mu \ (E^{1\%}_{1\text{cm.}}=287)$$

and at $$345 \text{ m}\mu \ (E^{1\%}_{1\text{cm}}=277)$$

and in N/10 NaOH having a maximum at $$280 \text{ m}\mu \ (E^{1\%}_{1\text{cm.}}=766)$$

has a neutral equivalent of 548, has the following average elemental analysis: C, 59.1%; H, 5.35%; N, 5.90% and O (by difference), 29.65%; and when pelleted in potassium bromide exhibits characteristic absorption in the infrared region of the spectrum as shown in FIGURE 1; and salts of said acidic substance.

Referring to the drawings.

There is further provided, according to the present invention, the process for the production of an antibiotic substance, designated coumermycin, which comprises cultivating a strain of *Streptomyces rishiriensis* in an aqueous carbohydrate solution containing a nitrogenous nutrient under submerged aerobic conditions until substantial activity versus Gram-positive bacteria is imparted to said solution and then recovering said coumermycin from said solution.

The organism producing the antibiotic of the present invention was isolated from a sample of soil collected in Rishiri Island, Hokkaido, Japan and is a new species, designated *Streptomyces rishiriensis* of the genus Streptomyces. A culture of the living organism, given the laboratory designations 404Y3 and A9795, has been deposited in the American Type Culture Collection, Washington, D. C. and added to its permanent collection of microorganisms as A.T.C.C. 14812.

The representative strain, No. 404Y3 of *S. rishiriensis* has the following characteristics:

CULTURAL CHARACTERISTICS

G=growth; A=aerial mycelium; S= soluble pigment; B=biochemical property

1. Czapek's agar:
   G: moderate, yellowish gray to light brownish gray or ivory yellow
   A: poor, powdery, white
   S: none
2. Glycerol Czapek's agar:
   G: moderate, yellowish gray or light brownish gray to pale yellow with faint brown
   A: poor, powdery, white
   S: none or pale yellow with faint brown
3. Glycerol ammonium salt agar:
   G: moderate, light yellowish gray to yellowish white
   A: scant, powdery, light yellowish gray to light gray
   S: none 4. Glucose asparagine agar:
   G: poor, thin, glossy, light yellowish gray
   A: none
   S: none
5. Starch agar:
   G: good, light yellowish gray to ivory yellow
   A: moderate, powdery, spreading, faint brown to pale brown with gray
   S: none
   B: hydrolysis is moderately strong
6. Nutrient agar:
   G: moderate, burnt umber to brown
   A: poor, powdery, white
   S: dark brown
7. Bennett's agar:
   G: moderate, grayish olive brown to grayish brown
   A: moderate, white to pale brown to brownish gray
   S: yellow brown
8. Oatmeal soyton agar:
   G: good, pale yellow with faint brown
   A: moderate, white to gray with faint brown
   S: pale yellow with faint brown
9. Potato plug:
   G: good, glossy, wrinkled surface
   A: none
   S: plug changed brownish black
10. Gelatin Stab:
    G: brownish black colony on the surface
    A: none
    S: dark brown
    B: negative liquefaction
11. Tyrosine yeast gelatin stab:
    G: brownish black colony on the surface
    A: none
    S: dark brown
    B: negative liquefaction
12. Milk:
    G: brownish ring formation
    A: none
    S: faint brown
    B: not digested
13. Nitrate solution:
    G: white pellet mass on the surface
    B: positive reduction to nitrite
14. Melanin formation media:
    G: poor, thin, grayish black
    A: scant, white
    S: brownish gray to grayish brown
    B: melanin positive
15. Potato dextrose agar:
    G: good, glossy, brownish black
    A: moderate, white to pale pink to pale brown with faint gray
    S: gray or warm gray

UTILIZATION OF CARBON SOURCES

| | |
|---|---|
| Xylose ++ | Inulin ++ |
| Arabinose ++ | Salicin ++ |
| Glucose ++ | Mannitol − |
| Galactose ++ | Sorbitol ± |
| Fructose ++ | Cellobiose + |
| Sorbose − | Rhamnose ++ |
| Sucrose ++ | Sodium citrate + |
| Maltose ++ | Sodium succinate + |
| Lactose ++ | Inositol ++ |
| Raffinose ++ | Control − |

++ = good growth.
+ = fair growth.
± = doubtful growth.
− = no growth.

MYCOLOGICAL CHARACTERISTICS

The morphological properties of the strain were observed on starch agar and Bennett's agar. Microscopic examination of the aerial mycelium revealed tangled and branched hyphae, occasionally tuft, and sporophores which produced sinistrorse spirals. On electron microscopic observation, the shape of spores was found to be elliptical to oval and the surface was smooth.

Streptomyces 404Y3 has a brownish gray aerial mycelium and produces brown or dark brown pigment on organic media. Gelatin liquefaction is negative both in gelatin stab and tyrosine yeast gelatin stab and milk is not digested. Nitrite is produced from nitrate and starch is hydrolyzed. Strain 404Y3 resembles *S. diastatochromogenes, S. griseoruber, S. olivochromogenes, S. aureus, S. griseochromogenes, S. hawaiiensis* and *S. naganishi* in some respects such as spiral formation, color of aerial mycelium and melanoid pigment, but differs in certain cultural and physiological properties as shown below:

*S. diastatochromogenes.*—According to Waksman and Curtis, sporophores are straight, and according to Jensen, sinistrotrose spirals are produced. The color of aerial mycelium is reported to be white to ash gray on Czapek's and gray on glucose asparagine agar. Liquefaction on gelatin stab is fairly rapid.

*S. griseoruber.*—The shape of spore is reported to be cylindrical. The color of growth is reddish orange on Czapek's and light reddish orange to reddish purple on starch agar. Differences are also found on utilization of carbon sources such as sucrose, raffinose, citrate and succinate.

*S. olivochromogenes.*—Differences are found in growth color, soluble pigment on glucose asparagine agar and digestion of gelatin and milk.

*S. aureus.*—The color of growth is dark brown on Czapek's and light orange on glucose asparagine agar. Gelatin liquefaction is rapid later slowing down.

*S. griseochromogenes.*—The color of aerial mycelium is white to light neutral gray. Gelatin liquefaction is moderate. Milk is peptonized without coagulation. Differences are also found in utilization of carbon sources such as rhamnose, inulin, salicin, citrate and succinate.

*S. hawaiiensis.*—The growth color on glucose asparagine agar is light brown and aerial mycelium is white to gray. Differences are also found in utilization of carbon sources such as sorbitol and succinate.

*S. naganishi.*—The growth color on starch agar is cream with reddish purple and soluble pigment on starch agar is faint pink. Gelatin is moderately liquefied. Milk is coagulated and peptonized. Differences are observed in utilization of carbon sources such as sucrose and sorbitol.

In order to select strains of high productivity, ultraviolet irradiation was done on the original strain and mutant colonies were selected. Some of the higher producers among these strains were investigated mycologically, but notable differences were not observed except for obtaining a few strains of white aerial mycelium.

In view of the above characteristics of the strain, Streptomyces 404Y3 was determined to be a new species and designated *Streptomyces rishiriensis* nov. sp.

The species *Streptomyces rishiriensis* described herein includes all strains of streptomyces which form coumermycin and which cannot be definitely differentiated from the strain No. 404Y3 and its subcultures including multants and variants. The properties of coumermycin are described herein and, after these properties are known, it is easy to differentiate the strains producing coumermycin from others.

*Streptomyces rishiriensis* when grown under suitable conditions, produces coumermycin. A fermentation broth containing coumermycin is prepared by inoculating spores or mycelia of the coumermycin-producing organisms into a suitable medium and then cultivating under aerobic conditions. For the production of coumermycin, cultivation on a solid medium is possible, but for production in a large quantity cultivation in a liquid medium is preferable. The temperature of the cultivation may be varied over a wide range, 20–35° C., within which the organism may grow but a temperature of 26–30° C. and a substantially neutral pH is preferred. In the submerged aerobic fermentation of the organism for the production of coumermycin, the medium contains as the source of carbon, a commercially available glyceride oil or a carbohydrate such as glycerol, glucose, maltose, sucrose, lactose, dextrin, starch, etc. in pure or crude states, and as the source of nitrogen an organic material such as soybean meal, distillers' solubles, peanut meal, cottonseed meal, meat extract, peptone, fish meal, yeast extract, corn steep liquor, etc., and, when desired, inorganic sources of nitrogen such as nitrates and ammonium salts, and mineral salts such as sodium chloride, potassium chloride and magnesium sulfate, and buffering agents such as calcium carbonate or phosphates and trace amounts of heavy metal salts; such medium ingredients include those listed in Canadian Patent 513,324 and in British Patents 730,341 and 736,325 and in United States Patents 2,691,618; 2,658,018; 2,653,899; 2,586,762; 2,516,080; 2,483,892; 2,609,329 and 2,709,672. In aerated submerged culture an antifoam such as liquid paraffin, fatty oils or silicone is used. More than one kind of carbon source, nitrogen source or antifoam may be used for the production of coumermycin. Generally, the cultivation is continued until at least several hundred mcg./ml. of coumermycin has accumulated in the medium. In some cases the broth pH decreased at the beginning and then gradually rose.

The following examples will serve to illustrate this invention without limiting it thereto.

*Example 1*

Fermentation conditions suitable for production of the antibiotic coumermycin were studied and the following composition of medium was found to be useful in shake culture: 1.5% soluble starch, 2.0% cottonseed endosperm flour ("Pharmamedia"), 0.1% $K_2HPO_4$, 0.1% NaCl, 0.05% $MgSO \cdot 7H_2O$, 0.05% $CaCl_2$ 0.001% $ZnSO_4 \cdot 7H_2O$ and 0.2% yeast extracts.

Coumermycin is produced in three to five days' fermentation under adequate aeration and agitation and the activity is found in both the broth filtrate and the mycelium. Coumermycin is assayed against *Staphylococcus aureus* FDA 209P by paper-disc or cylinder plate method.

*Example 2*

Submerged aerobic fermentation of *S. rishiriensis* (strain 404Y3) in shake flasks in a medium containing 6% starch ("Staclipse J"), 3% debittered brewers' yeast and 1% $CaCO_3$ produced 300–400 mcg./ml. coumermycin.

*Example 3*

Submerged aerobic fermentation of *S. rishiriensis* (strain 404Y3) in shake flasks in a medium containing 6% starch ("Staclipse J"), 3% cottonseed endorsperm flour ("Pharmamedia"), 2.5% distillers' solubles and 1% $CaCO_3$ produced 150–200 mcg./ml. coumermycin.

*Example 4*

Submerged aerobic fermentation of *S. rishiriensis* (strain 404Y3) in shake flasks in a medium containing 1.0% soybean meal, 2.0% cottonseed endosperm flour ("Pharmamedia"), 2.0% soluble starch, 0.5% glycerine, 0.2% yeast extracts, 0.2% $K_2HPO_4$, 0.1% $MgSO_4$, 1.0% $CaCO_3$ and 0.05% silicone antifoam at pH 7.0 gave coumermycin as follows:

| Time, days | pH | Potency in mcg./ml. |
|---|---|---|
| 5 | 7.8 | 70 |
| 6 | 8.1 | 80 |
| 7 | 8.3 | 120 |

*Example 5*

CONSTITUENTS OF MEDIUM

| | | |
|---|---|---|
| Soybean Meal | percent | 2.0 |
| Glycerine | do | 1.5 |
| Yeast extract | do | 0.2 |
| Potassium phosphate, dibasic | do | 0.1 |
| Sodium chloride | do | 0.1 |
| Calcium chloride | do | 0.05 |
| Magnesium sulfate | do | 0.05 |
| Zinc sulfate | do | 0.001 |
| pH | | 7.0 |

A culture medium (100 ml.) containing the above components was sterilized in a flask of 500 ml. volume, inoculated with a seed culture of *Streptomyces rishiriensis* strain 404Y3 and cultivated at 27°±1° C. for six days with shaking, whereupon the production of coumermycin in the fermentation broth reached 150 mcg./ml.

*Example 6*

CONSTITUENTS OF MEDIUM

| | | |
|---|---|---|
| Cottonseed endosperm flour ("Pharmamedia") | percent | 2.0 |
| Soluble starch | do | 1.5 |
| Yeast extract | do | 0.2 |
| Potassium phosphate, dibasic | do | 0.1 |
| Sodium chloride | do | 0.1 |
| Calcium chloride | do | 0.05 |
| Magnesium sulfate | do | 0.05 |
| Zinc sulfate | do | 0.001 |
| pH | | 7.0 |

A culture medium (100 ml.) containing the above components was sterilized in a flask of 500 ml. volume, inoculated with a seed culture of *Streptomyces rishiriensis* strain 404Y3–30 (which is a mutant strain of 404Y3 obtained by irradiation of ultraviolet ray) and cultivated at 27°±1° C. for nine days with shaking, whereupon the production of coumermycin in the fermentation broth reached 400 mcg./ml.

*Example 7*

A culture medium (30 l.) containing the same components as in Example 6 was sterilized in a stainless steel tank of 50 liter volume, inoculated with a seed culture of *Streptomyces rishiriensis*, and cultivated at 28°±1° C. for 90 hours, whereupon the production of coumermycin in the fermentation broth reached 120 mcg./ml.

The fermentation broth (5 l.) was filtered at pH 8.0 and the filtrate was adjusted to pH 6.0 and extracted with 2 liters methyl isobutyl ketone. The mycelial cake was extracted with 500 ml. of acetone with vigorous stirring and the extract was evaporated in vacuo to remove the solvent. The resultant aqueous concentrate was extracted with 200 ml. of methyl isobutyl ketone at pH 6.0. The two ketone extracts were combined and washed with 500 ml. of water and then the activity was transferred into 1000 ml. of cold water adjusted to pH 10.0 by sodium hydroxide. The aqueous extract was adjusted to pH 6.0 and again extracted by 300 ml. of ethyl acetate which was concentrated in vacuo to 30 ml. Upon the addition of 150 ml. of petroleum ether to the concentrate a light brown amorphous precipitate appeared which was collected, washed with small amounts of methanol to remove colored contaminant and dried to give 750 mg. of coumermycin as a powder.

The coumermycin powder (400 mg.) thus obtained was dissolved in 100 ml. of ethyl acetate and adsorbed on a column of 20 gm. alumina which was previously treated with sulfuric acid. The column was washed with 200 ml. of ethyl acetate and eluted with methanol. The eluate was taken fractionally in 10 ml. portions and the active fractions were combined and concentrated in vacuo to dryness. The pale yellow solid coumermycin thus obtained was recrystallized twice from methanol to give 70 mg. of white crystalline coumermycin which melted at 218–220° C. with decomposition.

Coumermycin was further purified by Craig's technique of counter-current distribution using a solvent system five parts (by volume) carbon tetrachloride, one part chloroform, five parts methanol and one part water. After 50 transfers, the peak of concentration was found in tube number 26 by bioassay curve, by ultraviolet assay curve and by weight curve; these curves agreed with the theoretical curve. Lyophilization of ten tubes around this peak gave pure coumermycin.

Coumermycin has also been purified by recrystallization from aqueous acetone and then from absolute methanol to give material melting at 220° C. with decomposition.

Coumermycin has also been purified by alumina chromatography, in which 39.7 mgm. (potency 500 mcg./mgm.) was dissolved in ethyl acetate and adsorbed on 2 g. $Al_2O_3$ (pH 4.7, treated with $H_2SO_4$). After washing with ethyl acetate, the column was eluted successively with methanol and acidic methanol. The active fractions were combined, neutralized, concentrated in vacuo and then lyophilized to give 12.4 mgm. as pale yellowish powder (potency 700 mcg./mgm.).

Coumermycin (480 mgm.) was treated with a small amount of active carbon in acetone solution and then recrystallized from hot ethanol to give 230 mgm. of crystalline coumermycin which was dried in vacuo for three hours at 50° C. Melting point 222–224° C. (dec.), pKa 6.32 in 75% acetone. Titration equivalent: 526.5.

*Analysis.*—Calc'd. for $C_{26}H_{26}N_2O_{10}$: C, 59.35; H, 4.98; N, 5.32. Found: C, 59.1; H, 5.35; N, 5.90.

A molecular weight determination by the cryoscopic method in dioxane gave a value of 500±20. The specific rotation $[\alpha]_D^{20}$ was −134.4° (c.=1%, acetone) as compared to −69.6° for novobiocin under the same conditions. Coumermycin gave a negative (brown) anthrone test whereas novobiocin gave a positive (green) anthrone test.

A solution of 100 mgm. coumermycin in 120 ml. absolute ethanol was stirred with 0.25 gm. of Adams' catalyst under atmospheric pressure of hydrogen for 30 minutes at room temperature. Almost no hydrogen uptake was observed. After removal of the catalyst, 35 ml. of water was added to the filtrate with vigorous stirring. Addition of 0.5 ml. of one normal hydrochloric acid to the resulting emulsion precipitated a white solid which was collected, dried and found to weigh 88.7 mgm. and to be original starting material, i.e., coumermycin as confirmed by paper chromatography. Under the same conditions 1000 mgm. novobiocin gave 946 mgm. dihydronovobiocin as confirmed by paper chromatographic analysis according to the literature (F. J. Wolf et al., Antibiotics Annual 1956–1957, page 1035).

Coumermycin gives positive Fehling and Molisch reactions and decolorizes bromine. Ninhydrin, Tollens and anthrone reactions are negative.

Paper strip chromatography of coumermycin gave the following results:

| Solvent system: | Rf value |
| --- | --- |
| Wet butanol | 0.15 |
| 3% Aqueous ammonium chloride | 0.03 |
| 75% Phenol | 0.95 |
| 50% Acetone | 0.75 |
| Butanol-methanol-water (4:1:2)+2% methyl-orange | 0.45 |
| Butanol-methanol-water (4:1:2) | 0.40 |
| Benzene-methanol (4:1) | 0.05 |
| Distilled water | 0.05 |
| Butanol-water (4:1)+0.25% p-toluenesulfonic acid | 0.30 |
| Butanol-water-acetic acid (2:1:1) | 0.50 |
| Butanol-water (4:1)+2% piperidine | 0.25 |

Coumermycin is readily soluble in acetone, dioxane and alkaline water, moderately soluble in ethanol, butanol, ethyl acetate, butyl acetate and methyl isobutyl ketone, less soluble in benzene, methanol and chloroform and insoluble in carbon tetrachloride, petroleum ether and acidic water.

Figure 2:
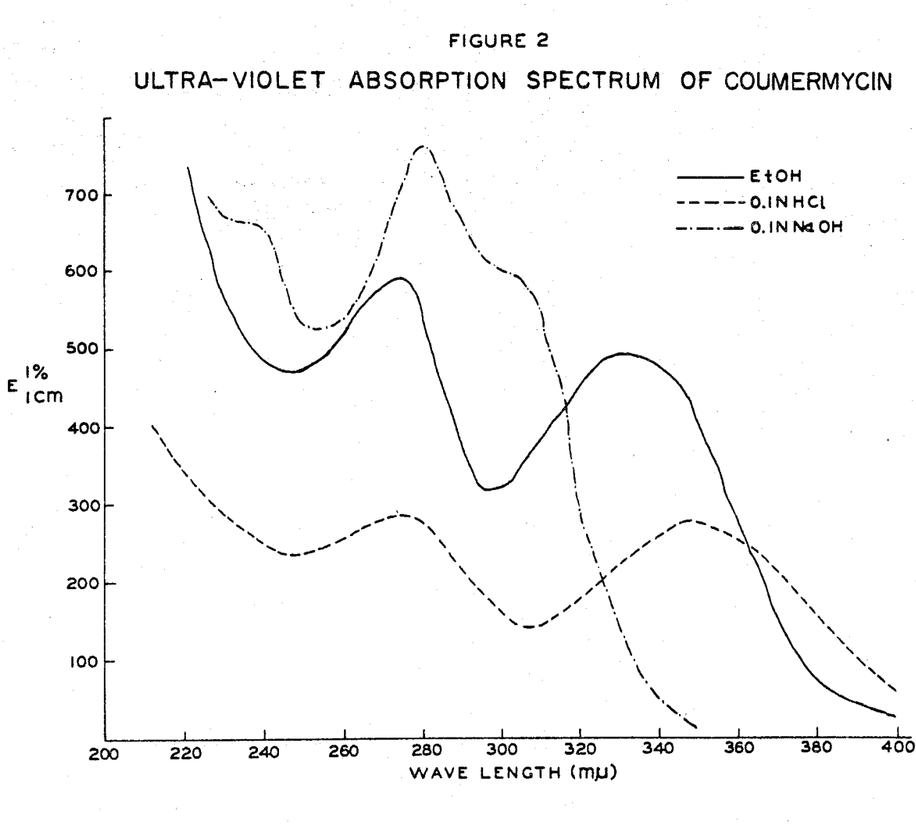
FIGURE 2 is a curve of the ultraviolet absorption spectrum of coumermycin in solution in ethanol, in 0.1 N HCl and in 0.1 N NaOH.

As shown in FIGURE 2, coumermycin exhibits an ultraviolet absorption spectrum containing the following maxima:

Maxima in ethanol, 275 m$\mu$ ($E_{1cm.}^{1\%}$=595), 335 m$\mu$ ($E_{1cm.}^{1\%}$=493)

Maxima N/10 HCl, 275 m$\mu$ ($E_{1cm.}^{1\%}$=287), 345 m$\mu$ ($E_{1cm.}^{1\%}$=277)

Maxima N/10 NaOH, 280 m$\mu$ ($E_{1cm.}^{1\%}$=766)

As shown in FIGURE 1, coumermycin when pelleted in potassium bromide exhibits characteristic infrared absorption maxima at the following wave lengths in microns: 2.99; 3.36 (shoulder); 3.45; 5.88 (shoulder); 5.92; 6.10; 6.24; 6.45; 6.55; 6.7; 7.2; 7.65; 7.85; 8.9; 9.2; 9.6; 10.05; 10.3; 10.6; 11.3; 12.25; 12.65; 13.1; 13.35.

Thus coumermycin and novobiocin are readily differentiated, e.g. by melting point, elemental analysis, specific rotation, ultraviolet and infrared absorption spectra, anthrone reaction and behavior in paper strip chromatography.

Coumermycin is an acidic organic compound which is easily soluble in alkaline solutions such as aqueous solutions of alkali metal and alkaline earth metal hydroxides. Thus solution of coumermycin in aqueous sodium hydroxide or calcium hydroxide forms the sodium or calcium salt, respectively, which can be isolated if desired, as by lyophilization. In like manner are formed salts with organic bases; addition of streptomycin or dihydrostreptomycin base to coumermycin forms the streptomycin and dihydrostreptomycin salts of coumermycin, respectively; for this reaction it is convenient to use an organic solvent such as ethyl acetate. Other amine salts which can be used include those used in therapy as salts of benzylpenicillin, e.g. procaine, N-benzyl-β-phenethylamine, hydrabamine, ephenamine, N,N'-dibenzylethylenediamine, dehydroabietylamine and dicyclohexylamine. Acidification of an aqueous solution of sodium coumermycin serves to precipitate purified coumermycin as the free acid.

One preferred method of isolating coumermycin from a fermentation broth comprises extracting whole broth at pH 6.0 with one-half volume of methyl isobutyl ketone, back extracting at pH 10.0 into water (one-quarter the volume of the methyl isobutyl ketone phase) and re-extracting at pH 6.0 into ethyl acetate or methyl isobutyl ketone (one-third the volume of the last aqueous phase). The final concentrated solution of coumermycin in the organic solvent is then concentrated to one-tenth or one-twentieth its original volume by distillation in vacuo. Coumermycin is then precipitated, if it does not precipitate spontaneously, by the addition of mixed lower alkanes, e.g. by the addition of ten volumes of "Skellysolve B."

Coumermycin is also easily recovered from filtered broths by adsorption on activated carbon ("Darco KB") and subsequent elution therefrom but this process is not superior to solvent extraction of whole broth as in many broths most of the coumermycin is in the mycelium.

*Microbiological Studies on Coumermycin in Vitro Antibacterial Activity.*—The minimum inhibitory concentrations (MIC) of coumermycin against a variety of microorganisms were determined by serial agar dilution method, using horse blood agar for hemolytic streptococci and pneumococci, glucose-yeast extract-peptone agar for lactic bacilli, nutrient agar for other bacteria, 2% glucose-Sabouraud agar for fungi and Kirchner's broth for tubercle bacilli. The results are tabulated below along with those obtained with novobiocin which was used as a reference.

ANTIBACTERIAL SPECTRUM OF COUMERMYCIN (AGAR DILUTION METHOD)

| Test Organism | MIC (mcg./cc.) | |
|---|---|---|
| | Coumermycin | Novobiocin |
| Gram-negative: | | |
| Escherichia coli NIHJ | >50 | 3.13 |
| Escherichia coli PO 1495 | >50 | 50 |
| Klebsiella pneumoniae Type A | 3.13 | 12.5 |
| Salmonella typhi | >50 | 6.25 |
| Shigella flexneri | >50 | 6.25 |
| Shigella dysenteriae A | >50 | 25 |
| Neisseria sp. (CP-R) | >50 | 12.5 |
| Bordetella bronchiseptica ATCC 4617 | >50 | >50 |
| Pseudomonas aeruginosa | >50 | >50 |
| Vibrio metchnikovii | 0.025 | 0.1 |
| Gram-positive: | | |
| Staphylococcus aureus FDA 209P | 0.003 | 0.049 |
| S. aureus FDA 209P (SM, ST-R) | 0.003 | 0.049 |
| S. aureus FDA 209P (NB-R) | 1.56 | 6.25 |
| S. aureus 52-34 (TC, EM, CM, PC-R) | 0.003 | 0.1 |
| S. aureus Smith strain | 0.006 | 0.049 |
| S. aureus 193 (PC, TC-R) | 0.003 | 0.049 |
| S. aureus 193 (PC, TC, EM, CM-R) | 0.003 | 0.1 |
| S. aureus 193 (PC, TC, EM-R) | 0.003 | 0.049 |
| S. aureus Terajima | 0.003 | 0.012 |
| S. albus | 0.006 | 0.049 |
| Micrococcus flavus | 0.006 | 0.049 |
| Sarcina lutea PCI 1001 | 0.025 | 0.1 |
| B. subtilis PCI 219 | 50 | 0.1 |
| B. sphericus 122 | 0.78 | 0.39 |
| B. mycoides "O" | 0.78 | 0.78 |
| B. cereus ATCC 10702 | 3.13 | 0.1 |
| B. anthracis : 115 | 0.78 | 0.1 |
| Lactobacillus casei ATCC 7469 | >50 | 0.1 |
| L. acidophilus B-406-1 | >50 | 0.39 |
| Streptococcus faecalis B-40203 | 3.13 | 0.78 |
| S. pyogenes Type 3 | 3.13 | 0.78 |
| Diplococcus pneumoniae Type II | 1.56 | 50 |
| Mycobacterium 607 | 50 | 12.5 |
| Mycobacterium phlei | 50 | |
| Fungi: | | |
| Aspergillus niger van Tieghem | >50 | >50 |
| Penicillium chrysogenum | >50 | >50 |
| Candida albicans | >50 | >50 |
| Saccharomyces cerevisiae ATCC 9763 | >50 | >50 |
| Trichophyton mentagrophytes | >50 | >50 |

Abbreviations: -R=resistant; SM=streptomycin; ST=streptothricin; NB=novobiocin; TC=tetracycline; PC=penicillin; EM=erythromycin; CM=carbomycin.

The minimum inhibitory concentrations of coumermycin were also tested by two-fold tube dilution method using nutrient broth except for hemolytic streptococci and pneumococci which were tested by brain-heart infustion broth. The results are tabulated below along with the activity ratio of coumermycin and novobiocin.

ANTIBACTERIAL SPECTRUM OF COUMERMYCIN (TUBE DILUTION METHOD)

| Test Organism | Coumermycin, mcg./ml. | Novobiocin, mcg./ml. | Ratio |
|---|---|---|---|
| Klebsiella pneumoniae | 3.13 | 6.25 | 2 |
| Staphylococcus aureaus FDA 209P | 0.0015 | 0.049 | 32 |
| Staphylococcus aureaus Terajima | 0.00075 | 0.012 | 16 |
| Staphylococcus aureus Smith | 0.0015 | 0.024 | 16 |
| Sarcina lutea PCI 1001 | 0.006 | 0.049 | 8 |
| Corynebacterium xerosis 53-K-1 | 0.00075 | 0.024 | 32 |
| Bacillus cereus ATCC 10702 | 0.78 | 0.78 | 1 |
| Bacillus anthracis 115 | 0.39 | 0.195 | ½ |
| Streptococcus pyogenes Type 3 | 0.049 | 0.39 | 8 |
| Diplococcus pneumoniae Type II | 0.098 | 0.098 | 1 |

Coumermycin inhibits the growth of various Gram-positive bacteria except for *Bacillus subtilis* and lactic bacilli which are sensitive to novobiocin. Coumermycin is especially active against staphylococci, the activity being 10 to 30 times greater than novobiocin. It shows, however, reduced activity against the staphylococci which were made resistant to novobiocin in the laboratory.

*Effect of inoculum size on the minimum inhibitory concentration.*—Using *Staph. aureus* Smith strain and *Staph. aureus* strain 193 as test organisms in nutrient broth, tube dilutions were run with various inoculum sizes. The results are tabulated below and it will be seen that the effect of heavy inocula is similar to that obtained with novobiocin.

*Effect of pH of medium on the minimum inhibitory concentration.*—The MIC of coumermycin was treated by broth dilution method, the pH of the media being adjusted to several levels. Nutrient broth and Difco's brain-heart infusion broth were used as test media, and a $10^4$ dilution of an overnight culture of *Staph. aureus* Smith ($10^5$ cell/ml.) was inoculated into each tube. As shown below, the activity of coumermycin increases in acidic pH and decreases in alkaline pH. The comparative data with novobiocin indicate that coumermycin is affected by media pH to a greater extent than novobiocin.

EFFECT OF MEDIA pH ON MIC

| Media | M.I.C. in mcg./ml. | | | |
|---|---|---|---|---|
| | Coumermycin | | Novobiocin | |
| pH | NB[1] | BHI[2] | NB | BHI |
| 6.3 | 0.0001 | 0.00005 | 0.024 | 0.024 |
| 7.0 | 0.003 | 0.006 | 0.098 | 0.098 |
| 7.6 | 0.049 | 0.098 | 0.195 | 0.39 |
| 8.2 | 0.39 | 0.78 | 0.78 | 0.78 |
| 8.5 | 1.56 | 3.13 | 1.56 | 1.56 |

[1] NB=nutrient broth.
[2] BHI=brain-heart infusion broth.

*Effect of media on the minimum inhibitory concentration.*—The effect was examined using four kinds of media; namely, nutrient broth, brain-heart infusion broth (Difco), trypticase-soy broth and 1% yeast extract broth. The MIC was not affected by the media used for the determination as long as the pH of the media was controlled.

*Effect of serum on the minimum inhibitory concentration.*—Increasing concentrations of human serum were added to nutrient broth containing phosphate buffer in a final concentration of 1/10 M to maintain the media pH at 7.2. *Staphylococcus aureus* Smith was used as a test organism, inoculum size being $10^5$ cell/ml. As tabulated below, the MIC was markedly affected by serum.

EFFECT OF SERUM ON MIC

| Serum Concentration, Percent | MIC in mcg./ml. | |
|---|---|---|
| | Coumermycin | Novobiocin |
| Without serum | 0.003 | 0.098 |
| 2.5 | 0.024 | 0.195 |
| 5 | 0.098 | 0.195 |
| 10 | 0.098 | 0.39 |
| 20 | 0.098 | 0.18 |
| 50 | 0.195 | 3.13 |

*Activity of coumermycin against clinically isolated staphylococci.*—A variety of *Staph. aureus* cultures (126 strains) isolated from clinical sources were tested in vitro

EFFECT OF INOCULUM SIZE ON MIC

| Test Organism | Antibiotic | Inoculum Size (cell/ml.) | | | | | |
|---|---|---|---|---|---|---|---|
| | | $10^7$ | $10^6$ | $10^5$ | $10^4$ | $10^3$ | $10^2$ |
| | | (MIC in mcg./ml.) | | | | | |
| S. aureus Smith | Coumermycin | 0.012 | 0.012 | 0.003 | 0.003 | 0.003 | 0.003 |
| S. aureus Smith | Novobiocin | 0.39 | 0.39 | 0.195 | 0.098 | 0.098 | 0.098 |
| S. aureus strain 193 | Coumermycin | 0.024 | 0.003 | 0.0015 | 0.0015 | 0.0015 | 0.0015 |
| S. aureus strain 193 | Novobiocin | 0.78 | 0.195 | 0.098 | 0.098 | 0.098 | 0.098 | against coumermycin and six commercial antibiotics; namely, benzylpenicillin, dihydrostreptomycin, tetracycline, erythromycin, kanamycin and novobiocin. The MIC values were obtained by ten-fold serial agar dilution method as follows:

SENSITIVITY OF CLINICAL ISOLATES (STAPHYLOCOCCI) TO COUMERMYCIN AND COMMERCIAL ANTIBIOTICS

| MIC in mcg./ml. | Antibiotics | | | | | | |
|---|---|---|---|---|---|---|---|
| | Coumermycin | PC | DSM | TC | EM | KM | NB |
| >100 | 0 | 0 | 3 | 0 | 0 | 0 | 0 |
| 100 | 0 | 1 | 16 | 2 | 1 | 0 | 0 |
| 10 | 0 | 7 | 103 | 0 | 3 | 0 | 1¹ |
| 1 | 0 | 89 | 2 | 8 | 117 | 123 | 0 |
| 0.1 | 1¹ | 21 | 0 | 114 | 3 | 3 | 122 |
| 0.01 | 52 | 7 | 0 | 2 | 0 | 0 | 1 |
| 0.001 | 48 | 0 | 2 | 0 | 2 | 0 | 2 |
| 0.0001 | 21 | 0 | 0 | 0 | 0 | 0 | 0 |
| 0.00001 | 4 | 0 | 0 | 0 | 0 | 0 | 0 |

¹ Same strain.

PC=benzylpenicillin. DSM=dihydrostreptomycin. TC=tetracycline. EM=erythromycin. KM=kanamycin. NB=novobiocin.

The results indicate that coumermycin is highly active against staphylococci and it is not cross-resistant with other antibiotics. Only one strain out of 126 strains which was resistant to novobiocin was found to be less sensitive to coumermycin, but the MIC value of coumermycin to that strain was 0.1 mcg./ml.

IN VIVO EXPERIMENTS ON COUMERMYCIN

*Toxicity.*—Coumermycin is an antibiotic of low toxicity. The intramuscular $LD_{50}$ was found to be 500 mg./kg. in mice.

*Chemotherapeutic effect.*—The in vivo activity of coumermycin was tested on mice against an experimental infection of *Staphylococcus aureus* Smith strain. Mice were infected intraperitoneally with $100 \times LD_{50}$ of the pathogen and the antibiotic was administered intramuscularly or orally just after the bacterial challenge. A single intramuscular $CD_{50}$ value (50% curative dose) of 0.3 mg./kg. and a single oral $CD_{50}$ of 4.5 mg./kg. were obtained. In a comparative test, intramuscular and oral $CD_{50}$ values of novobiocin were found to be 6.0 mg./kg. and 10.0 mg./kg., respectively. The data are presented below.

CHEMOTHERAPEUTIC EFFECT OF COUMERMYCIN (INTRAMUSCULAR THERAPY)

| Dose in mg./kg. | Coumermycin | Novobiocin |
|---|---|---|
| 50 | ¹5/5 | 6/6 |
| 25 | 5/5 | 6/6 |
| 12.5 | 5/5 | 4/6 |
| 6.25 | 11/11 | 4/6 |
| 3.12 | 6/6 | 1/6 |
| 1.56 | 6/6 | 0/6 |
| 0.78 | 12/12 | 0/6 |
| 0.39 | 4/6 | ---------- |
| 0.19 | 1/6 | ---------- |
| 0.10 | 1/6 | ---------- |
| 0.05 | 0/6 | ---------- |
| Control | 0/12 | 0/12 |

CHEMOTHERAPEUTIC EFFECT OF COUMERMYCIN (ORAL THERAPY)

| | | |
|---|---|---|
| 100 | 5/5 | ---------- |
| 50 | 11/11 | 6/6 |
| 25 | 6/6 | 6/6 |
| 12.5 | 6/6 | 5/6 |
| 6.25 | 10/12 | 1/6 |
| 3.12 | 1/3 | 1/6 |
| 1.56 | 0/6 | 0/6 |
| 0.78 | 0/6 | 0/6 |
| Control | 0/12 | 0/12 |

¹ Number of mice survived/number of mice infected.

Coumermycin is a useful agent for the treatment of mastitis in cattle or calf scours; for this purpose use is made, for example, of suspensions in vegetable oil for instillation in the teats to treat mastitis, containing 1 to 1000 mgm./ml., and preferably about 50 mgm., of the antibiotic, or enough capsules to provide a total dosage of 0.25 to 2.0 grams by oral administration as for calf scours.

When desired for specific purposes and rendered pharmaceutically compatible, there may be admixed with the compounds of the present invention other medicaments such as antihistamines, sulfa drugs, [e.g. sulfadiazine, sulfabenzamide, sulfacetamide, sulfanilamide, sulfapyridine, sulfathiazole, sulfapyrazine, sulfaguanidine, sulfathalidine, sulfasuxidine, sulfisoxazole, sulfamylon, phthalylsulfacetamide, N' - 3,4 - dimethylbenzoylsulfanilamide, benzylsulfanilamide and N'-2-(2-quinoxalyl)sulfanilamide], lipotropic agents (particularly methionine, choline, inositol and betasitosterol and mixtures thereof), stimulants of the central nervous system (e.g. caffeine, amphetamines), local anesthetics, analgesics (e.g. aspirin, salicylamide, sodium gentisate, p-acetylaminophenol, phenacetin, codeine), sedatives, (e.g. barbiturates, bromides), salts of benzylpenicillin (e.g. potassium penicillin G, procaine penicillin G, 1-ephenamine penicillin G, dibenzylamine penicillin G, other salts disclosed by U.S. Patent 2,627,491; these combinations are particularly useful to enable variation of the pattern of blood levels obtained), phenoxymethylpenicillin, phenethicillin, methicillin, oxacillin, cloxacillin, nafcillin, cepholathin and other synthetic penicillins and salts thereof, other antibiotic agents (e.g. streptomycin, dihydrostreptomycin, bacitracin, polymixin, tyrothricin, erythromycin, chlortetracycline, oxytetracycline, tetracycline, oleandomycin, chloramphenicol, magnamycin, novobiocin, cycloserine, neomycin, kanamycin; in some cases such combinations attack a wider range of organisms or show synergistic efficacy or provide decreased toxicity with equal efficacy), vitamins (e.g. A, $A_1$, $B_1$, $B_2$, $B_6$, $B_{12}$ and members of that family, folic acid and members of that family, vitamins C, $D_2$, $D_3$ and E), hormones (e.g. cortisone, hydrocortisone, 9-α-fluorocortisone, 9-α-fluorohydrocortisone, prednisone and prednisolone), anabolic agents, (e.g. 11,17-dihydroxy-9-α - fluoro - 17 - α - methyl - 4 - androsten - 3 - one; 17 - α - ethyl-19-nortestosterone) and antifungal agents (e.g. mycostatin).

The antibiotic of the present invention is a useful agent for the detection of contamination by Gram-negative bacteria, fungi, yeasts and the like in the course of the commercial production of the enzymes streptokinase and streptodornase by the growth of streptococci and the production of amylase by fermentation of *B. subtilis* or *B. cereus*. Thus, the addition of 1 to 1000 mcg./ml. and preferably about 10 mcg./ml., of the antibiotic to an aliquot of inoculated medium followed by incubation, permits the growth of undesirable contaminants and their visual detection.

The data given above were obtained, as previously stated, on the coumermycin complex, called simply coumermycin. Paper chromatography serves to separate the mixtures of coumermycins $A_1$ and $A_2$ from zones of antibacterial components which have been named coumermycin B, coumermycin C and coumermycin D.

Mixtures of coumermycins $A_1$ and $A_2$, free of other components, are easily obtained by the procedures set forth below. The identity and amount of each of coumermycin $A_1$ and coumermycin $A_2$ in such mixtures is determined by the use of gas chromatography. In this procedure a mixture of coumermycins $A_1$ and $A_2$ (10 mgm.) is suspended in dry reagent grade methanol (200 microliters) in a 5 mm. glass tube having one end sealed. To this suspension is added 2.5 M sodium methoxide in methanol (17 microliters). The solids dissolve. The tube is chilled in a solid $CO_2$-acetone bath, sealed, placed in a 60° C. bath for 15 minutes, removed and opened. Of the reaction mixture therein, 10 microliters are chromatographed on an 8 foot by ¼ inch copper column containing 13.5 grams of five percent by weight of (Craig) polyester succinate (supplied by Wilkins Instrument and Research Inc.) on dichlorodimethylsilane-treated diatomaceous earth ("Gas-Crom Z" supplied by Applied Science Laboratories Inc., State College, Pa.). The instrument is a gas chromatograph supplied by F & M Scientific Corp., Avondale, Pa. The bridge power is 200 milliamperes, the attenuation is 2X, the starting column is 100° C., the heating rate is 4° C. per minute, the detector block temperature is 260° C., the injection port is 280° C. and the gas (helium) flow from the column is 60 ml./minute and from the detector is 20 ml./min. Under these conditions the methyl esters of pyrrole-2-carboxylic acid (from coumermycin $A_2$) and 5-methyl-pyrrole-2-carboxylic acid from coumermycin $A_1$ have retention times of 12 and 15 minutes respectively. The detector measures thermal conductivity versus helium alone and when recorded is used to make a quantitative determination of the amounts present of the two methyl esters and thus of the amounts of coumermycins $A_1$ and $A_2$ in the original mixture.

Of these components of the coumermycin complex, the one of greatest interest as an antibacterial agent is coumermycin $A_1$. Unless special fermentation techniques are used, it is accompanied by a roughly equal amount of coumermycin $A_2$ from which it is extremely difficult to separate by any process of a commercial nature.

COUMERMYCIN $A_1$ AND COUMERMYCIN $A_2$

A highly efficient method of causing this fermentation to produce coumermycin $A_1$ to the virtual exclusion of coumermycin $A_2$, that is, less than one or two percent of the latter, is a method which is not a part of the present invention but which comprises adding a salt, preferably a water-soluble salt, of cobalt to the medium at or near the beginning of the fermentation. A typically useful salt is $CoCl_2$. Amounts of 0.0001, 0.0004, 0.0008 and 0.0016% have been found to be highly effective in the usual media. Typical broths contain 500–1000 mcg./ml. of coumermycin $A_1$ and contains zero, less than one or less than two percent coumermycin $A_2$ by analysis. A typical medium is that set forth in Example 8 with the omission of the linseed oil.

Example 8

COUMERMYCIN $A_1$

*Streptomyces rishiriensis* (six gallons of inoculum) was fermented with agitation beginning at the twentieth hour (two sets of impellers at 155 r.p.m.) and with aeration at 75 cubic feet per minute at 81° F. for 190 hours in 800 gallons of a medium sterilized thirty minutes at 250° F. containing the following ingredients: 7.0% starch ("Staclipse J"), 2.0% cottonseed endosperm flour ("Pharmamedia"), 1.0% debittered yeast, 0.4% $(NH_4)_2SO_4$, 1.0% raw linseed oil (containing cobalt salts), 0.5% $CaCO_3$, 0.25% $K_2HPO_4$, 2.0% lard oil and 0.05% of a water-soluble condensation product, having a total molecular weight of about 1900–2000, of ethylene oxide with a water-insoluble, hydrophobic polyoxypropylene chain formed by condensing propylene oxide with propylene glycol, said hydrophobic chain having a molecular weight of about 1750 and constituting about 90% by weight of said water-soluble condensation product ("Pluronic L61"). The pH was initially 6.8, fell to 5.3 at 40 hours and then rose gradually to a final value of 6.4.

From this fermentation 2650 l. whole broth was adjusted to pH 6 with sulfuric acid and extracted with an equal volume of methyl isobutyl ketone (MIBK) by two-stage counter-current extraction. The MIBK was concentrated to one-tenth volume by vacuum distillation to precipitate the crude antibiotic. As it was contaminated with linseed oil, it was slurried several times in MIBK and in methanol. The product (367.3 g.) was then recrystallized in the acid form by slurrying it in a mixture of two parts water and eight parts acetone in which it was then dissolved by the addition of $NH_4OH$ to pH 10. After carbon decolorization the pH was lowered to 6 to precipitate the purified product, coumermycin $A_1$, as the acid (303.3 g.).

Figure 3:
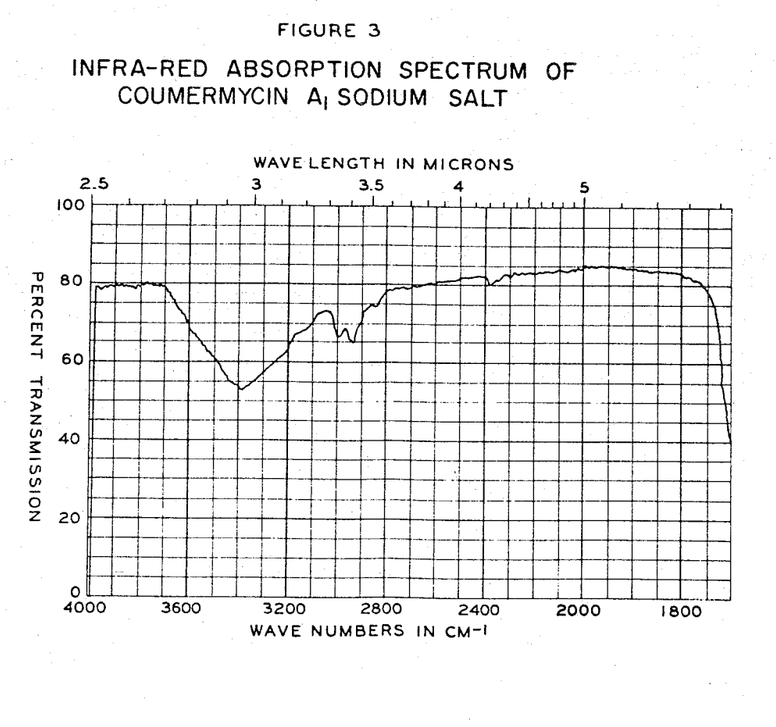
FIGURES 3 and 4 taken together are the infrared absorption spectrum of the monosodium salt of coumermycin $A_1$ when pelleted in potassium bromide.
Figure 4:
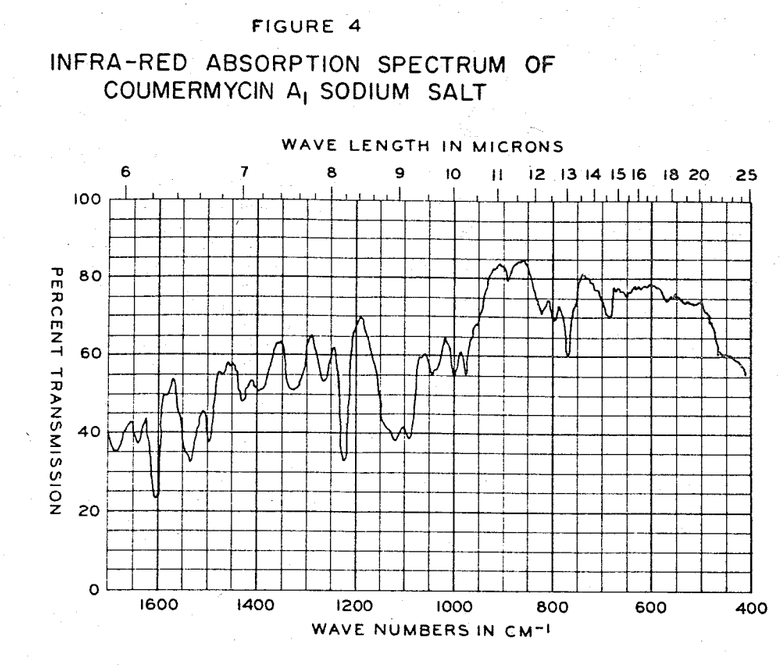

The acid was then converted to the monosodium salt. Thus, 300 g. acid was dissolved in 1500 ml. dimethylformamide and filtered. To the filtrate there was added 100 ml. of a 42% by weight solution of sodium 2-ethylhexanoate in dry n-butanol and then 8500 ml. dry n-butanol. Coumermycin $A_1$ spontaneously crystallized as the monosodium salt and was collected by filtration and found to weigh 272.5 g. and to be over 99% pure as determined by vapor phase chromatography. This material was then converted to the free acid, recrystallized from aqueous methyl ethyl ketone and from methanol-methylene chloride and reconverted by the above procedure to the monosodium salt which was recrystallized from ethanol-tetrahydrofuran to give 187 g. pure coumermycin $A_1$. When pelleted in potassium bromide this sample of coumermycin $A_1$, as shown in FIGURES 3 and 4, exhibited infrared absorption maxima at the following wave numbers in reciprocal centimeters: 3380, 2990, 2940, 1685, 1640, 1605, 1530, 1495, 1430, 1400–1380, 1320, 1265, 1225, 1140 (shoulder), 1120, 1090, 1045, 1000, 975, 890, 820, 795 and 770. The maxima at 1495 and 1225 cm.$^{-1}$ are exhibited by coumermycin $A_1$ but not by coumermycin $A_2$.

The antibacterial spectrum of the sample of coumermycin $A_1$ prepared above was tested by the tube dilution technique to determine the minimum concentrations (MIC) of the antibiotic completely inhibiting growth of bacteria for 25 hours. The following results were obtained:

|  | Medium [1] | MIC in mcg./ml. | |
| --- | --- | --- | --- |
|  |  | 1st run | 2nd run |
| *Bacillus subtilis* | HIB | 7.3 | 12.5 |
| *Escherichia coli* | HIB | 12.5 | 12.5 |
| *Klebsiella pneumoniae* | HIB | 6.3 | 6.3 |
| *Proteus morganii* | HIB | 6.2 | 6.3 |
| *Proteus vulgaris* | HIB | 3.1 | 3.1 |
| *Pseudomonas aeruginosa* 8602/A | HIB | 12.5 | 25 |
| *Pseudomonas aeruginosa* (Yale) | HIB | 25 | 25 |
| *Salmonella enteritidis* | HIB | 12.5 | 25 |
| *Salmonella typhosa* | HIB | 12.5 | 12.5 |
| *Staphylococcus aureus* (Smith) | HIB | 0.004 | 0.002 |
| *Staphylococcus aureus* (Smith) | HIB+S | 1.6 | 6.3 |
| *Streptococcus pyogenes* | HIB | 0.062 | 0.062 |
| *Proteus vulgaris* No. 329 | HIB |  | 12.5 |

[1] HIB—Difco Heart Infusion broth, HIB+S—Same mixed 1:1 with pooled human serum.

Coumermycin $A_1$ has the structural formula:

*Production of coumermycin $A_1$.*—*Streptomyces rishiriensis* grows luxuriantly at 26–30° C. in agitated or aerated submerged culture. A typical fermentation medium suitable for the production of coumermycin $A_1$ contains the following ingredients: 4.0% hydrolyzed corn starch, 3.5% "Pharmamedia," 0.4% glycerin, 0.2% yeast extract, 0.8% $CaCO_3$, 1.0% $KH_2PO_4$, 0.2% KCl.

Coumermycin $A_1$ is produced in six to eight days' fermentation under adequate aeration and agitation, the activity being found mainly in the mycelium. Coumermycin is assayed against *Staphylococcus aureus* FDA 209P by cylinder plate method, the inhibition zone being 20–21 mm. with a solution of 0.5 mcg./ml. of coumermycin $A_1$.

*Extraction and purification of coumermycin $A_1$.*— Coumermycin $A_1$ was isolated from the fermentation broth by a solvent extraction procedure. The broth was filtered at pH 5 with filter aid, more than 95% of the activity being found in the mycelial cake which was extracted twice with a solvent mixture of acetone and dioxane (10:1). The combined extracts were distilled in vacuo to remove the solvents, and the aqueous concentrate was extracted with ethyl acetate or methyl isobutyl ketone at pH 6.0. The solvent extract was washed with water and then transferred to half volume of water at pH 9.0, extracted again into ethyl acetate at pH 6.0 and then concentrated in vacuo to a small volume. Upon the addition of seven volumes of petroleum ether to the concentrate, the activity separated as a light brown flocculent precipitate which was collected by filtration, washed with methanol to remove colored impurities, and then dried in vacuo. The crude antibiotic was dissolved in a small amount of dioxane, filtered and precipitated with the addition of five to seven volumes of methanol. The light yellow solid thus obtained was reprecipitated from hot ethanol to give white solid with a potency of 800–900 mcg./mg.

Further purification of the antibiotic could be achieved by partition chromatography or counter-current distribution, but recrystallization of the monosodium salt of coumermycin $A_1$ was found to be more efficient.

A semi-pure preparation of the antibiotic was dissolved in tetrahydrofuran (10% w./v.) then 0.1 N aqueous sodium hydroxide solution was added dropwise to give a pH of 6.5. The solution was diluted with five volumes of ethanol then concentrated in vacuo to a small volume. Needle crystals were formed when the concentrate was kept standing overnight at room temperature. These were recrystallized from boiling ethanol using a small amount of active carbon. The colorless needles thus obtained were analytically pure monosodium salt of coumermycin $A_1$. Pure free acid of coumermycin $A_1$ was prepared from the monosodium salt.

*Physico-chemical properties of coumermycin $A_1$.*— Coumermycin $A_1$ is a white acidic antibiotic, readily soluble in alkaline water, dioxane, tetrahydrofuran and dimethylformamide, moderately soluble in acetone, methyl isobutyl ketone, methyl ethyl ketone and ethyl acetate, less soluble in butanol, ethanol, methanol, chloroform and benzene, and insoluble in carbon tetrachloride, petroleum ether and acidic water. Mono- and disodium salts of the antibiotic are more soluble in ethanol than the free acid.

The free acid of coumermycin $A_1$ turns brown at 240–245° C. and decomposes at 258–260° C. It analyzes well for $C_{55}H_{59}N_5O_{20}$. Calculated: C, 59.51; H, 5.36; N, 6.31. Found: C, 60.15, 59.98; H, 5.59, 5.49; N, 6.10, 6.22. The molecular weight was determined osmometrically to be approximately 1100 compared to the theoretical value of 1110.1. Titration equivalent was found to be 566 in 75% aqueous dioxane solution with a pKa' of 7.76.

The crystalline monosodium salt of coumermycin $A_1$ decomposes at 245° C. with gas evolution.

*Analysis.*—Calculated for $C_{55}H_{58}N_5O_{20}Na$: C, 58.35; H, 5.16; N, 6.19; Na, 2.03. Found: C, 58.03; H, 5.26; N, 6.18. The sodium content was found to be 1.99% by flame spectrophotometric assay. The monosodium salt was titrated both by 0.1 N NaOH and 0.1 N HCl with an equivalent weight of 1121 by NaOH and 1182 by HCl. Coumermycin $A_1$ is levorotatory: $[\alpha]_D^{25} = -141.1°$ (c. 1, 75% aqueous acetone).

In the ultraviolet absorption spectra of monosodium coumermycin $A_1$ absorption maxima are observed at the following wave lengths:

In ethanol:

214 m$\mu$ ($E_{1cm.}^{1\%}=670$), 273 m$\mu$ ($E_{1cm.}^{1\%}=485$), 330 m$\mu$ ($E_{1cm.}^{1\%}=362$)

In acidic ethanol: [1]

274 m$\mu$ ($E_{1cm.}^{1\%}=432$), 344 m$\mu$ ($E_{1cm.}^{1\%}=500$)

In alkaline ethanol: [2]

213 m$\mu$ ($E_{1cm.}^{1\%}=861$), 237 m$\mu$ ($E_{1cm.}^{1\%}=510$), 283 m$\mu$ ($E_{1cm.}^{1\%}=576$)

Coumermycin $A_1$ gave a positive reaction with Fehling, Molisch and Ehrlich reagents and decolorized bromine in acetic acid. Tollens reagent gave a silver mirror after about eight hours, and anthrone gave a brown color. The ninhydrin reaction was negative. The following Rf values were obtained with monosodium coumermycin $A_1$ by ascending paper strip chromatography: butanol, 0.30; aqueous 3% ammonium chloride, 0.03; 50% acetone, 0.69; butanol-methanol-water (4:1:2), 0.25; benzene-methanol (4:1), 0.16; water, 0.06. One solvent system was used to separate other closely related antibiotic fractions formed during the fermentation and isolation studies. This descending system consists of two parts of acetone and three parts of 0.1 molar triethanolamine adjusted to pH 7 with glacial acetic acid.

---
[1] 95% ethanol containing N/100 HCl.
[2] 95% ethanol containing N/100 NaOH.

IN VITRO MICROBIOLOGICAL STUDIES

*Antibacterial Spectrum.*—The minimum inhibitory concentration (MIC) of coumermycin $A_1$ against a variety of microorganisms was determined by the serial two-fold dilution method. Crystalline monosodium salt of coumermycin $A_1$ was sterilized by dissolving it in 80% aqueous ethanol at a concentration of 2000 mcg./ml. and serial dilutions were made by sterile water in a set of sterile test tubes. From each tube 0.5 ml. was taken and mixed with 9.5 ml. of the respective test medium, the pH of the media being adjusted to 7.0. Mostly, nutrient agar was employed as the test medium, however 10% horse blood agar was used for hemolytic streptococci and pneumococci, glucose-yeast-peptone agar for lactobacilli, 2% glucose-Sabouraud agar for fungi and Kirchner's broth for tubercle bacilli. The results are tabulated along with those obtained with novobiocin which was used as a reference:

$5 \times 10^4$, $5 \times 10^3$, $5 \times 10^2$, and 50 cell/ml. were used and the MIC was determined by two-fold serial tube dilution method, adjusting the initial pH of the test medium to 7.0. It was found that heavy inocula of more than $10^6$ cell/ml. increase the MIC value of coumermycin $A_1$ and a similar effect was observed with novobiocin.

*Effect of media pH on the minimum inhibitory concentration.*—The MIC of coumermycin $A_1$ was tested by broth dilution method, the pH of the media being controlled by M/10 phosphate buffer in heart infusion broth. A $10^4$ dilution of an overnight culture of *Staphylococcus aureus* 209P ($5 \times 10^4$ cell/ml.) was inoculated into each tube. It was found that the activity of coumermycin increases in acidic pH and decreases in alkaline pH. The comparative data with novobiocin indicate that coumermycin $A_1$ is affected my media pH to a greater extent than novobiocin.

*Effect of serum on the minimum inhibitory concentra-*

ANTIBACTERIAL SPECTRUM OF COUMERMYCIN $A_1$

| Test Organism | Test Media [1] | MIC mcg./ml. Coumermycin $A_1$ | MIC mcg./ml. Novobiocin | Ratio NB/NM |
|---|---|---|---|---|
| Gram-negative: | | | | |
| *E. coli* NIHJ | A | 6.25 | 12.5 | 2 |
| *E. coli* PO 1495 | A | 12.5 | 100 | 8 |
| *E. coli* PO 1495 (CP, TC-R) | A | 6.25 | >100 | ---------- |
| *E. coli* ATCC 9637 | A | 6.25 | 50.0 | 8 |
| *K. pneumoniae* Type A | A | 0.78 | 3.12 | 4 |
| *Salmonella typhi* | A | 6.25 | 6.25 | 1 |
| *Salmonella paratyphi* A | A | 1.56 | 1.56 | 1 |
| *Shigella dysenteriae* A | A | 6.25 | 25.0 | 4 |
| *Shigella flexneri* | A | 6.25 | 3.12 | 2 |
| *Shigella sonnei* | A | 1.56 | 50.0 | 32 |
| *B. brochiseptica* ATCC 4617 | A | 12.5 | >100 | ---------- |
| *Neisseria* sp. (CP-R) | A | 12.5 | 12.5 | 1 |
| *Pseudomonas aeruginosa* | A | 12.5 | 100 | 8 |
| Gram-positive: | | | | |
| *Staph. aureus* FDA 209-P | A | 0.0012 | 0.039 | 32 |
| *Staph. aureus* FDA 209-P (ST, SM-R) | A | 0.0012 | 0.019 | 16 |
| *Staph. aureus* FDA 209-P (NB-R) | A | 0.156 | 5.0 | 32 |
| *Staph. aureus* 52-34 (PC, TC, EM, CM-R) | A | 0.0012 | 0.078 | 64 |
| *Staph. aureus* 193 (PC, TC, EM, CM-R) | A | 0.0006 | 0.039 | 64 |
| *Staph. aureus* 193 (PC, TC-R) | A | 0.0012 | 0.039 | 32 |
| *Staph. aureus* Smith strain | A | 0.0012 | 0.039 | 32 |
| *Staph. albs* | A | 0.0025 | 0.019 | 8 |
| *Micrococcus flavus* | A | 0.0025 | 0.039 | 16 |
| *Sarcina lutea* PCI 1001 | A | 0.005 | 0.078 | 16 |
| *Corynebacterium xerosis* 53-K-1 | A | 0.0006 | 0.0012 | 2 |
| *Bacillus subtilis* PCI 219 | A | 0.312 | 0.312 | 1 |
| *Bacillus sphericus* 122 | A | 0.156 | 0.156 | 1 |
| *Bacillus mycoides* strain "O" | A | 0.078 | 0.312 | 4 |
| *Bacillus cereus* ATCC 10702 | A | 0.156 | 0.625 | 4 |
| *Bacillus anthracis* 115 | A | 0.156 | 0.156 | 1 |
| *Streptococcus pyogenes* Type 3 | B | 0.78 | 0.78 | 1 |
| *Diplococcus pneumoniae* Type II | B | 0.78 | 0.78 | 1 |
| *Diplococcus pneumoniae* DP-3-5A | B | 0.78 | 6.25 | 8 |
| *L. casei* ATCC 7469 | C | >10 | 0.039 | ---------- |
| *L. acidophillus* B-406-1 | C | >10 | 0.078 | ---------- |
| Acid-fast: | | | | |
| *Mycobacterium tuberculosis* var hominis $H_{37}Rv$ | D | 0.78 | 12.5 | 16 |
| *Mycobacterium* 607 | D | 12.5 | 25 | 2 |
| *Mycobacterium phlei* | D | 1.56 | 6.25 | 4 |
| Fungi: | | | | |
| *Aspergillus niger* var Tieghen | E | >100 | >100 | ---------- |
| *Penicillium chrysogenum* | E | >100 | >100 | ---------- |
| *Candida albicans* | E | >100 | >100 | ---------- |
| *Saccharomyces cerevisiae* ATCC 9763 | E | >100 | >100 | ---------- |

[1] A=nutrient agar. B=nutrient agar containing 10% horse blood. C=glucose 1.0%, dry yeast extract 0.5%, polypeptone 0.5%, sodium acetate 1.0%, agar 1.5%. pH 7.4. D=Kirchner's broth (MIC after 10 days). E=Sabouraud agar containing 2% glucose.
Abbreviations: -R=resistant; CM=carbomycin; CP=chloramphenicol; EM=erythromycin; NB=novobiocin; PC=penicillin; SM=streptomycin; ST=streptothricin; TC=tetracycline.

Coumermycin $A_1$ inhibits the growth of Gram-positive, Gram-negative and acid-fast bacteria. It is remarkably active against staphylococci, the activity being about 30 times greater than novobiocin. It shows, however, reduced activity against a laboratory strain of staphylococcus which was made resistant to novobiocin. Two strains of lactobacilli tested, which are sensitive to novobiocin, were found to be resistant to coumermycin $A_1$.

*Effect of inoculum size on the minimum inhibitory concentration.*—The test was done using *Staphyloccus aureus* 209P as the test organism and heart infusion broth as the medium. Six levels of inocula, $5 \times 10^6$, $5 \times 10^5$,

*tion.*—Increasing concentrations of human serum were added to heart infusion broth containing phosphate buffer in a final concentration of M/10 to maintain the medium pH at 7.0. *Staphylococcus aureus* 209P was used as a test organism, the inoculum size being $5 \times 10^4$ cell/ml. It was found that the MIC of coumermycin $A_1$ and novobiocin was markedly affected by serum.

*Activity of coumermycin against clinically isolated staphylococci.*—A variety of *Staphylococcus aureus* cultures (126 strains) isolated from clinical sources were tested in vitro against coumermycin along with six commercial antibiotics: namely, benzylpenicillin, dihydrostreptomycin, tetracycline, erythromycin, kanamycin, and novobiocin. The MIC values were obtained by ten-fold serial agar dilution method and the material used was a coumermycin complex containing approximately 70% of coumermycin $A_1$. The data are presented above.

The results indicate that coumermycin is highly active against staphylococci and is not cross-resistant with other antibiotics. Only one strain out of 126 strains was found to be resistant to novobiocin. This strain was also found to be more resistant to coumermycin.

IN VIVO EXPERIMENTS ON COUMERMYCIN $A_1$

*Toxicologic studies.*—Coumermycin $A_1$ is an antibiotic of low toxicity. The acute subcutaneous $LD_{50}$ in mice was 380 mg./kg. No death occurred by oral administration of 2000 mg./kg. in the same species. Chronic toxicity was examined in a group of ten rats which received intramuscularly 25 mg./kg./day or orally 100 mg./kg./day of the antibiotic daily for 60 days (6 day/week basic). In this experiment, novobiocin was used as a reference and saline was given to control groups. The weight gain was normal and no adverse effect was observed during the treatment period.

*Chemotherapeutic effect on mice.*—The in vivo activity of coumermycin $A_1$ was tested on mice against an experimental infection of *Staphylococcus aureus*, Smith strain. The material used was the free acid form of the antibiotic, dissolved in dioxane and diluted to the appropriate concentrations with sterile water. Mice were infected intraperitoneally with $100 \times LD_{50}$ of the pathogen and the antibiotic was administered subcutaneously or orally just after the bacterial challenge. The log-probit method of Litchfield and Wilcoxon in J. Pharmacol. Exp. Therap. 96(2):99–113, (1949) was used for the calculation of median curative dose ($CD_{50}$). A subcutaneous $CD_{50}$ of 0.13 mg./kg. and an oral $CD_{50}$ of 4.3 mg./kg. were obtained. In a comparative test, subcutaneous and oral $CD_{50}$ values of novobiocin were found to be 3.0 mg./kg. and 7.6 mg./kg., respectively.

*Example 9*

COUMERMYCIN $A_2$

*Streptomyces rishiriensis* was fermented 171 hours with agitation and aeration at 83° F. in a medium containing the following ingredients: 7.0% starch ("Staclipse J"); 3.0% cottonseed endosperm flour ("Pharmamedia"); 1.5% debittered yeast; 0.5% $CaCO_3$; 0.4% $K_2HPO_4$ and 0.01% "Pluronic L61." The coumermycin complex so produced contained a large proportion of coumermycin $A_2$ and was isolated as a solid by solvent extraction (MIBK).

Three hundred grams of the above material were converted to sodium coumermycin $A_2$ by the procedure of the preceding example after removing the 17% of starting material which was insoluble in tetrahydrofuran. The product was recrystallized by dissolving in 15 ml. (per gram of solid) of a solution of equal parts of methylene chloride and methanol by warming to boiling, stirring vigorously, filtering, boiling off some methylene chloride, adding methanol to a haze point and cooling slowly to allow crystals to form.

The product was then purified by Craig counter-current distribution using 40 ml. of aqueous phase and 20 ml. of solvent upper phase in a 200-tube apparatus. The solvent system used was 15 liters of 0.25 molar triethylamine in water mixed with 30 liters methyl ethyl ketone and adjusted to pH 8.0 with glacial acetic acid. Twenty grams of product were put into 16 tubes and 700 transfers were made. In two runs the coumermycin $A_2$ found in tubes 105–129 was combined (9.0 g.) put into the first eight tubes of the Craig apparatus using the same solvent system and, after 700 transfers, collected from tubes 115–134 (2.5 g.), converted to the free acid and reconverted to 1.145 g. crystalline sodium salt of coumermycin $A_2$ for which the following analytical results were obtained:

|   | Theory, percent | Found, percent | | Average, percent |
|---|---|---|---|---|
| C | 57.6 | 57.75 | 57.40 | 57.58 |
| H | 4.94 | 4.54 | 4.72 | 4.63 |
| N | 6.34 | 5.62 (5.82 cor.) | 6.18 (6.41 cor.) | 5.90 (6.13) |
| Ash | (Na 2.08) | 3.5 | 3.00 | 3.25 |
| Percent Volatile | | 4.15 | 3.9 | 4.0 |

Figure 5:
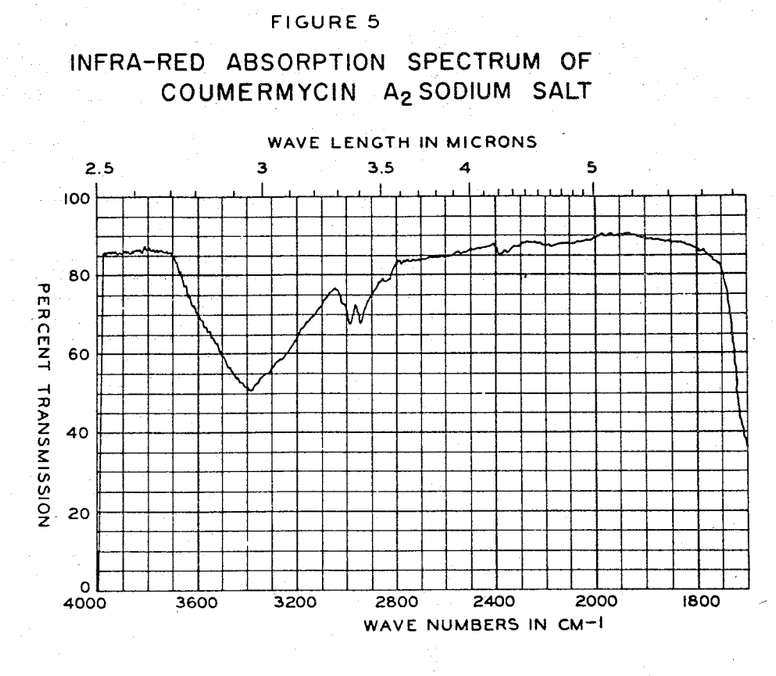
FIGURES 5 and 6 taken together are the infrared absorption spectrum of the monosodium salt of coumermycin $A_2$.
Figure 6:
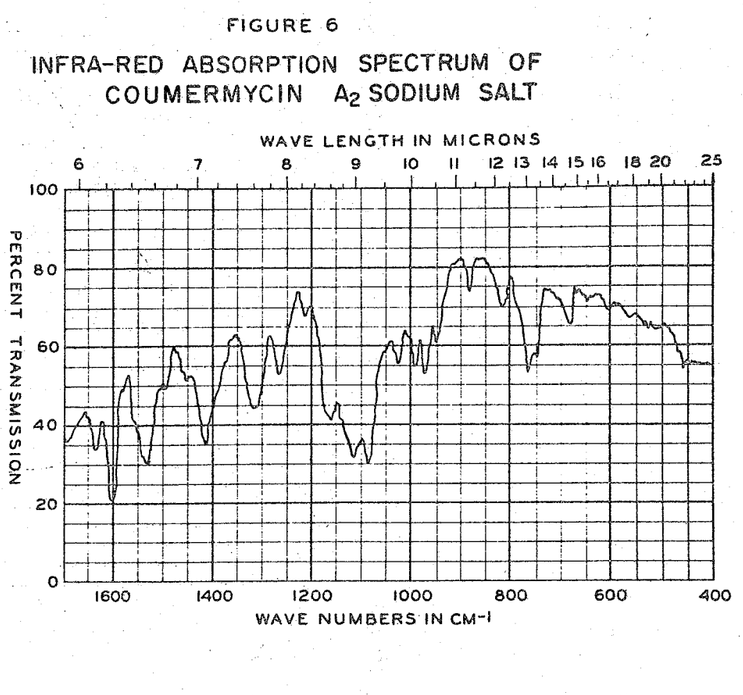

When pelleted in potassium bromide this sample of coumermycin $A_2$ as shown in FIGURES 5 and 6, exhibited infrared absorption maxima at the following wave numbers in reciprocal centimeters: 3380, 2980, 2940, 1695, 1638, 1604, 1535, 1413, 1315, 1265, 1160, 1120, 1090, 1030, 995, 973, 950, 885, 820, 765, 750. The bands at 1413 and 950 cm.$^{-1}$ are present in coumermycin $A_2$ but not in coumermycin $A_1$.

Coumermycin $A_2$ has the structural formula:

The antibacterial spectrum in vitro of the sample of coumermycin $A_2$ prepared above was tested by the tube dilution technique to determine the minimum concentrations (MIC) of the antibiotic completely inhibiting growth of bacteria for 24 hours. The following results were obtained:

|   | Medium [1] | MIC in mcg./ml. | |
|---|---|---|---|
|   |   | 1st run | 2nd run |
| *Bacillus subtilis* | HIB | 12.5 | 12.5 |
| *Escherichia coli* | HIB | >100 | >100 |
| *Klebsiella pneumoniae* | HIB | 12.5 | 12.5 |
| *Proteus morganii* | HIB | 25 | 25 |
| *Proteus vulgaris* | HIB | >100 | >100 |
| *Pseudomonas aeruginosa* 8602/A | HIB | >100 | >100 |
| *Pseudomonas aeruginosa* (Yale) | HIB | >100 | >100 |
| *Salmonella enteritidis* | HIB | 50 | >100 |
| *Salmonella typhosa* | HIB | >100 | >100 |
| *Staphylococcus aureus* (Smith) | HIB | 0.25 | >1 |
| *Staphylococcus aureus* (Smith) | HIB+S | 50 | 50 |
| *Streptococcus pyogenes* | HIB | 0.5 | 0.5 |
| *Proteus vulgaris* No. 329 | HIB | | >100 |

[1] HIB—Difco Heart Infusion broth, HIB+S Same mixed 1:1 with pooled human serum.

We claim:

1. The process for the production of an antibiotic substance, designated coumermycin, which comprises cultivating a strain of *Streptomyces rishiriensis* in an aqueous carbohydrate solution containing a nitrogenous nutrient under submerged aerobic conditions until substantial activity versus Gram-positive bacteria is imparted to said solution and then recovering said coumermycin from said solution.

2. The process of claim 1 in which the ogranism is *Streptomyces rishiriensis*, A.T.C.C. 14812.

3. A process according to claim 1 wherein the antibiotic coumermycin is separated from the fermentation broth by extraction at an acidic pH in the range about 5 to about 6 of said antibiotic with a water-immiscible solvent in which said antibiotic is soluble.

4. A process according to claim 1 wherein the antibiotic coumermycin is separated from the fermentation broth by extraction at an acidic pH in the range about 5 to about 6 of said antibiotic into a water-immiscible solvent in which said antibiotic is soluble followed by concentration of said coumermycin-containing solvent.

5. A member selected from the group consisting of an acidic compound of the formula wherein R is a member selected from the group consisting of hydrogen and methyl and both R groups are alike; and nontoxic, pharmaceutically acceptable cationic salts thereof.

6. The compound of the formula

7. The compound of the formula

8. A nontoxic, pharmacetuically acceptable cationic salt of the compound of claim 6.

9. A nontoxic, pharmaceutically acceptable cationic salt of the compound of claim 7.

10. The sodium salt of the compound of claim 7.

11. The calcium salt of the compound of claim 7.

12. The streptomycin salt of the compound of claim 7.

13. The dihydrostreptomycin salt of the compound of claim 7.

14. The compound of claim 7 in substantially pure, solid form.

References Cited by the Examiner

UNITED STATES PATENTS

| 2,123,530 | 3/64 | Rhodes et al. | 195—80 |
| 3,126,317 | 3/64 | Heinemann et al. | 195—80 |

References Cited by the Applicant

UNITED STATES PATENTS

| 3,049,534 | 8/62 | Wallick. | |

OTHER REFERENCES

Hinman et al.: J. Amer. Chem. Soc. 79, 3789–3800 (1957).

The Merck Index, Seventh Edition, Merck and Co. Inc., Rahway, N.J. (1960), page 738.

LEWIS GOTTS, *Primary Examiner*.

Disclaimer 3,201,386.—*Hiroshi Kawaguchi, Masanori Okanishi*, and *Takeo Miyaki*, Tokyo, Japan. COUMERMYCIN AND SALTS THEREOF. Patent dated Aug. 17, 1965. Disclaimer filed Oct. 24, 1966, by the assignee, *Bristol-Banyu Research Institute, Ltd.*

Hereby enters this disclaimer to claims 6 and 8 of said patent.

[*Official Gazette January 24, 1967.*]